(12) United States Patent
Nakajima

(10) Patent No.: US 8,441,518 B2
(45) Date of Patent: May 14, 2013

(54) IMAGING APPARATUS, IMAGING CONTROL METHOD, AND RECORDING MEDIUM

(75) Inventor: Mitsuyasu Nakajima, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 326 days.

(21) Appl. No.: 12/750,004

(22) Filed: Mar. 30, 2010

(65) Prior Publication Data
US 2010/0245544 A1    Sep. 30, 2010

(30) Foreign Application Priority Data

Mar. 31, 2009    (JP) ................................. 2009-087747

(51) Int. Cl.
*H04N 13/00*    (2006.01)
*H04N 13/02*    (2006.01)
*H04N 13/04*    (2006.01)

(52) U.S. Cl.
USPC .................... 348/46; 348/42; 348/51; 348/56

(58) Field of Classification Search .................... 348/46, 348/419
See application file for complete search history.

(56) References Cited

U.S. PATENT DOCUMENTS

| 6,172,601 | B1 * | 1/2001 | Wada et al. | 340/436 |
|---|---|---|---|---|
| 6,603,876 | B1 * | 8/2003 | Matsuo et al. | 382/154 |
| 7,103,211 | B1 * | 9/2006 | Medioni et al. | 382/154 |
| 2003/0151659 | A1 | 8/2003 | Kawano et al. | |
| 2003/0197806 | A1 * | 10/2003 | Perry et al. | 348/370 |
| 2004/0105573 | A1 * | 6/2004 | Neumann et al. | 382/103 |
| 2007/0165129 | A1 | 7/2007 | Hill et al. | |

FOREIGN PATENT DOCUMENTS

| CN | 101082765 A | 12/2007 |
|---|---|---|
| JP | 07-167633 A | 7/1995 |
| JP | 9-46730 A | 2/1997 |
| JP | 10-254079 A | 9/1998 |
| JP | 2009-212734 A | 9/2009 |
| JP | 2010-219825 A | 9/2010 |
| KR | 10-2007-0039641 A | 4/2007 |
| KR | 100724889 B1 | 5/2007 |
| WO | 2005/091649 A1 | 9/2005 |

OTHER PUBLICATIONS

Japanese Office Action dated Jan. 11, 2011 (and English translation thereof) in counterpart Japanese Application No. 2009-087747.
Korean Office Action dated May 9, 2011 (and English translation thereof) in counterpart Korean Application No. 10-2010-0029167.
Chinese Office Action dated Mar. 1, 2012 (and English translation thereof) in counterpart Chinese Application No. 201010229252.3.
Chinese Office Action dated Dec. 4, 2012 (and English translation thereof) in counterpart Chinese Application No. 201010229252.3.

* cited by examiner

*Primary Examiner* — Joseph Ustaris
*Assistant Examiner* — On S Mung
(74) *Attorney, Agent, or Firm* — Holtz, Holtz, Goodman & Chick, P.C.

(57) ABSTRACT

An imaging apparatus includes: a first imaging controller configured to control imaging by an imaging unit; a movement distance acquirer configured to acquire movement distance of the imaging unit required to generate a three-dimensional image of the imaged subject after imaging by the first imaging controller; a first determining unit configured to determine whether or not the imaging unit has moved the movement distance acquired by the movement distance acquirer; a second imaging controller configured to control imaging with respect to the imaging unit in the case where it is determined by the first determining unit that the imaging unit has moved the movement distance; and a three-dimensional image generator configured to generate a three-dimensional image from the image acquired by the first imaging controller and the image acquired by the second imaging controller.

8 Claims, 8 Drawing Sheets

IMAGING APPARATUS, IMAGING CONTROL METHOD, AND RECORDING MEDIUM

CROSS-REFERENCE TO RELATED APPLICATION

This application claims the benefit of Japanese Patent Application 2009-87747, filed Mar. 31, 2009, the entire disclosure of which is incorporated by reference herein.

FIELD

This application relates generally to imaging, and more particularly, to an imaging apparatus, an imaging control method, and a recording medium.

BACKGROUND 3D modeling is a technology wherein, when a 3D representation of a person, animal, or other object such as artwork is to be obtained, the actual subject may be imaged using a camera to acquire its three-dimensional coordinates.

As a method of detecting the three-dimensional position of an object, stereo image techniques using two cameras have been known for some time. For example, in the stereo image technique disclosed in Patent Literature 1 (Unexamined Japanese Patent Application KOKAI Publication No. H07-167633), the distance between the object and the cameras (i.e., the depth) is computed from spacing between the two cameras as well as the difference in appearance (i.e., the parallax) between specific sites in images of the object respectively imaged by the two cameras. A 3D model of the object is then constructed on the basis of this distance.

However, acquiring a plurality of images having the desired parallax requires either a plurality of cameras, or a camera equipped with a plurality of imaging units, and thus there is a problem in that large-scale, special equipment becomes necessary.

SUMMARY

Being devised in order to resolve the above problems, the present invention has as an object to provide an imaging apparatus able to acquire high-precision 3D models, without the use of large-scale, special equipment.

In order to achieve the above object, an imaging apparatus in accordance with a first aspect of the present invention includes: an imaging unit; a first imaging controller configured to control imaging by an imaging unit; a movement distance acquirer configured to acquire the movement distance of the imaging unit required to generate a three-dimensional image of the imaged subject after imaging by the first imaging controller; a first determining unit configured to determine whether or not the imaging unit has moved the movement distance acquired by the movement distance acquirer; a second imaging controller configured to control imaging with respect to the imaging unit in the case where it is determined by the first determining unit that the imaging unit has moved the movement distance; and a three-dimensional image generator configured to generate a three-dimensional image from the image acquired by the first imaging controller and the image acquired by the second imaging controller.

In order to achieve the above object, an imaging control method in accordance with a second aspect of the present invention includes the steps of: controlling a first imaging by an imaging unit; acquiring the movement distance of the imaging unit required to generate a three-dimensional image of the imaged subject after the imaging in the first imaging controlling step; determining whether or not the imaging unit has moved the movement distance acquired in the acquiring step; controlling a second imaging by the imaging unit in the case where it is determined in the determining step that the imaging unit has moved the movement distance; and generating a three-dimensional image from the image acquired in the first imaging controlling step and the image acquired in the second imaging controlling step.

In order to achieve the above object, a recording medium in accordance with a third aspect of the present invention stores a program that causes a computer provided in an imaging apparatus to function as: a first imaging controller configured to control imaging by an imaging unit; a movement distance acquirer configured to acquire the movement distance of the imaging unit required to generate a three-dimensional image of the imaged subject after imaging by the first imaging controller; a determining unit configured to determine whether or not the imaging unit has moved the movement distance acquired by the movement distance acquirer; a second imaging controller configured to control imaging with respect to the imaging unit in the case where it is determined by the determining unit that the imaging unit has moved the movement distance; and a three-dimensional image generator configured to generate a three-dimensional image from the image acquired by the first imaging controller and the image acquired by the second imaging controller.

According to an embodiment of the present invention, an imaging apparatus is provided that is able to acquire high-precision 3D models, without the use of large-scale, special equipment.

BRIEF DESCRIPTION OF THE DRAWINGS

A more complete understanding of this application can be obtained when the following detailed description is considered in conjunction with the following drawings, in which.

DETAILED DESCRIPTION

Hereinafter, embodiments of the present invention will be described with reference to the accompanying drawings.

Embodiment 1

Figure 1A:
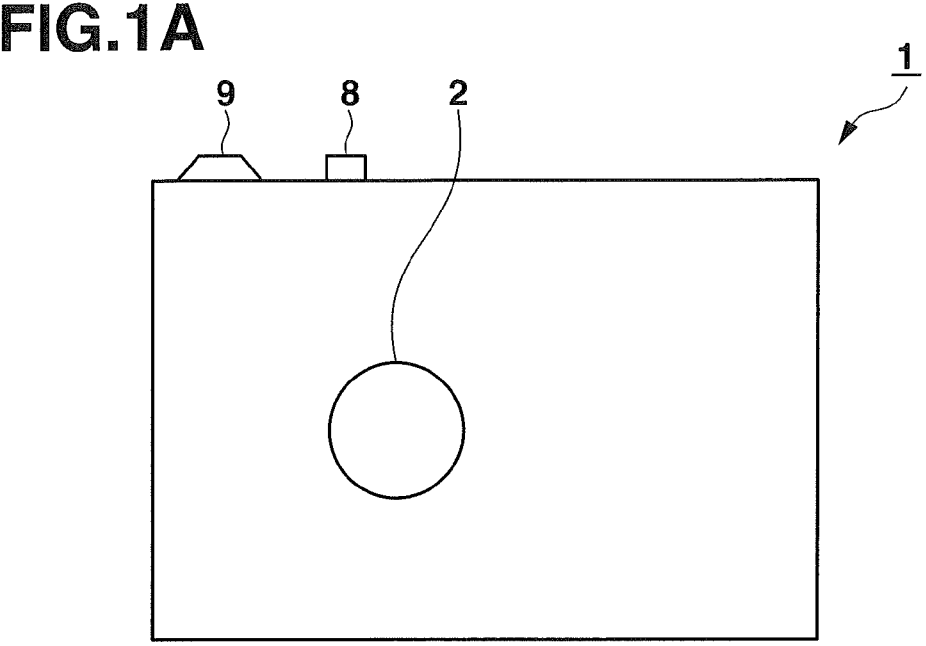
FIG. 1A is a front view illustrating the exterior of an exemplary digital camera in accordance with Embodiment 1 of the present invention.

As shown in FIG. 1A, the digital camera 1 in accordance with Embodiment 1 of the present invention includes optics (i.e., an imaging lens) 2 on its front.

Figure 1B:
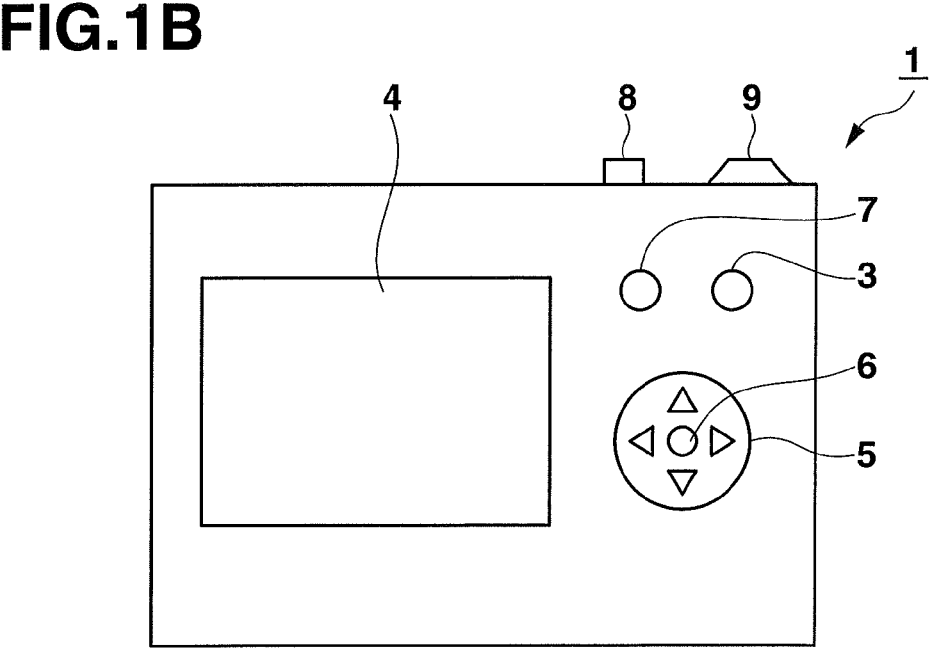
FIG. 1B is a rear view illustrating the exterior of an exemplary digital camera in accordance with Embodiment 1 of the present invention.

Also, as shown in FIG. 1B, a menu key 3, a display unit 4, a cursor key 5, a SET key 6, and a 3D modeling mode key 7 are provided on the back of the digital camera 1. Pressing the 3D modeling mode key 7 switches between a normal imaging mode and a 3D modeling mode.

Figure 1C:
FIG. 1C is a top view illustrating the exterior of an exemplary digital camera in accordance with Embodiment 1 of the present invention.

Furthermore, as shown in FIG. 1C, a shutter key 9 and a power button 8 are provided on the top of the digital camera 1.

Figure 2:
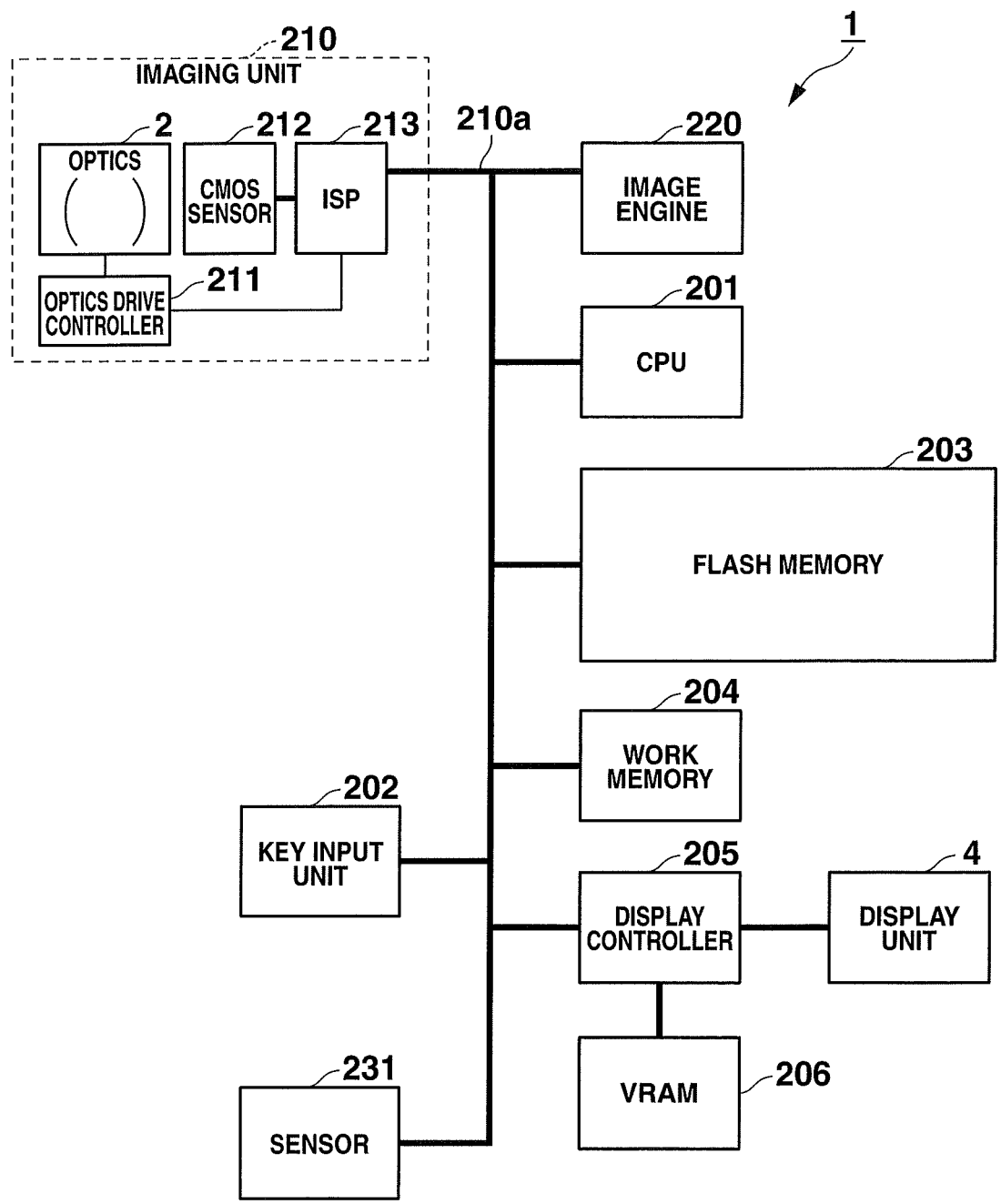
FIG. 2 is a block diagram illustrating an exemplary circuit configuration of a digital camera.

FIG. 2 is a block diagram illustrating an exemplary circuit configuration of the digital camera 1 shown in FIGS. 1A-1C.

In FIG. 2, the digital camera 1 is made up of an imaging unit 210, a CPU 201, flash memory 203, work memory 204, a display controller 205, a key input unit 202, an image engine 220, and a sensor 231, the above being connected by a bus 210a.

The imaging unit 210 is made up of the optics 2, an optics drive controller 211, a CMOS sensor 212, and an image signal processor (ISP) 213.

By means of the optics 2, light from a subject is focused onto the imaging surface of the CMOS sensor 212.

The optics drive controller 211 controls the optics 2. The internal configurations of the optics 2 and the optics drive controller 211 are not shown, but the optics drive controller 211 is provided with components such as a zoom motor for adjusting the magnification level, a focus motor for aligning the focal point, an aperture controller for adjusting the aperture, and a shutter speed controller, for example.

The CMOS sensor 212 photoelectrically converts light focused by the optics 2, and additionally performs A/D conversion, resulting in digital data.

The ISP 213 applies color conversion and data format conversion to the above digital data, thereby converting the digital data into a luminance signal Y and color-difference signal Cb and Cr.

The CPU 201 administers control operations for the digital camera 1 as a whole.

In response to the user operating the key input unit 202, the CPU 201 retrieves operational programs and menu data stored in program memory (not shown) for respective modes. Additionally, on the basis of retrieved operational programs and menu data, the CPU 201 controls the various components of the digital camera 1. Such operational programs include imaging control programs for the 3D modeling mode.

The key input unit 202 inputs operations made with respect to the respective menu key 3, cursor key 5, SET key 6, 3D modeling mode key 7, power button 8, and shutter key 9 shown in FIG. 1B, and notifies the CPU 201.

The work memory 204 is made up of DRAM or similar memory. Output from the imaging unit 210 (i.e., Y, Cb, and Cr data) is transferred to the work memory 204 by the CPU 201.

The flash memory 203 stores acquired image data that has been encoded by a JPEG compression unit (not shown) in the image engine 220, as well as 3D modeling data generated while in the 3D modeling mode.

The display controller 205 is connected to VRAM 206 and the display unit 4. The display controller 205 retrieves RGB-format display data from the VRAM 206, and displays the data on the display unit 4.

The image engine 220 is made up of a digital signal processor (DSP) or similar component. The image engine 220 takes the respective Y, Cb, and Cr data stored in the work memory 204, and after converting the data to RGB format, transfers the data to the VRAM 206 via the display controller 205.

The sensor 231 includes an angular velocity sensor as well as an acceleration sensor. The angular velocity sensor is used to detect whether or not the digital camera 1 has been rotated. Meanwhile, the acceleration sensor is used to compute translational distance when imaging.

In other words, if the results of the detection by the angular velocity sensor indicate that the optical axis of the field of view to be imaged by the digital camera 1 is no longer near-parallel (i.e., the digital camera 1 is no longer moving transversely), then the CPU 201 acquires the translational (movement) distance of the field of view to be imaged by the digital camera 1 from the acceleration detected and acquired by the acceleration sensor.

Figure 3:
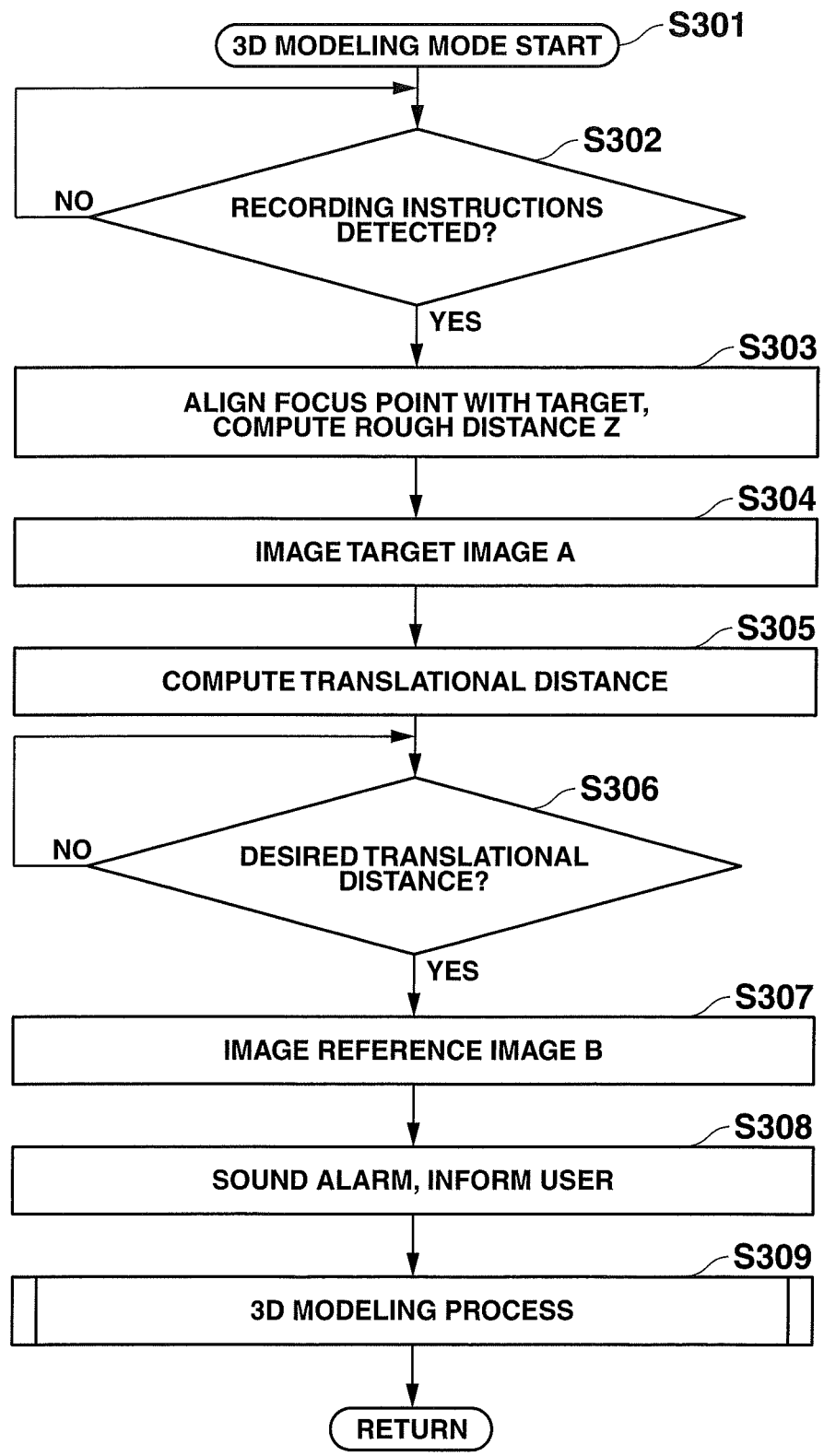
FIG. 3 is a flowchart for explaining the operation of an apparatus in accordance with Embodiment 1 of the present invention.

Next, operation of the digital camera 1 in accordance with Embodiment 1 described above will be described with reference to FIG. 3. When the 3D modeling mode is selected as a result of detecting the user operating the 3D modeling mode key 7, the CPU 201 starts the 3D modeling process shown in FIG. 3 (step S301). First, when the 3D modeling mode is initiated, the CPU 201 determines whether or not recording instructions have been detected (step S302). More specifically, the CPU 201 determines whether or not the user has been detected operating the shutter key 9. If a user operation has not been detected (step S302; NO), then the process stands by until a user operation is detected.

If the CPU 201 detects recording instructions as a result of the user pointing the digital camera 1 to an imaging target and operating the shutter key 9 (step S302; YES), then the CPU 201 acquires the focal length f by causing the optics drive controller 211 to match the focal point of the optics 2 with the imaging target. Additionally, the CPU 201 multiplies the acquired focal length f by the magnification level of the optics 2 to compute the distance Z from the digital camera 1 to the imaging target (step S303). Subsequently, the CPU 201 acquires an image from the imaging unit 210 (step S304). The acquired image at this point is herein taken to be the target image A.

Subsequently, the CPU 201 uses the following EQ. 1 to compute the translational distance 'L' of the digital camera 1 as required for 3D modeling (step S305).

$$L=(Z \cdot Z \cdot p)/(\Delta Z \cdot f) \qquad (1)$$

In the above EQ. 1, 'p' is the pixel size of the imaging element, while 'ΔZ' is the allowable margin of error with respect to the translation that is allowed when conducting 3D modeling.

For example, if it is assumed that the distance 'Z' is 1 m, the pixel size 'p' is 4 μm, the focal length 'f' is 6 mm, and the allowable margin of error 'ΔZ' is 5 cm, then the translational distance 'L' becomes 13 mm. In other words, if the distance to the target is 1 m, then favorable 3D modeling is possible if, after acquiring the target image A, the digital camera 1 is translated 13 mm and the field of view is acquired again.

If it is detected that translation of the digital camera 1 itself has started, then the CPU 201 uses the acceleration output from the acceleration sensor as a basis for determining whether or not the distance moved corresponds to the translational distance 'L' computed using EQ. 1 (step S306). If the translational distance 'L' has not been reached (step S306; NO), then the CPU 201 stands by until the translational distance 'L' is reached. In a parallel process, the angular velocity sensor detects rotations equal to or greater than a predetermined angle, and the CPU 201 determines whether or not the optical axis is no longer near-parallel. If it is determined that rotation equal to or greater than the predetermined angle occurred, then the CPU 201 reports that imaging has failed.

If it is determined that the distance moved corresponds to the translational distance 'L' (step S306; YES), then the CPU 201 conducts imaging for acquiring a reference image B (step S307). Next, the CPU 201 sounds an alarm informing the user that imaging has finished (step S308), and conducts 3D modeling using the target image A, the reference image B, and information from and the sensor 231 (step S309).

The above 3D modeling will now be described with reference to FIG. 4. First, the CPU 201 acquires feature point candidates in the target image A (step S401). The acquisition of feature point candidates may be conducted using any method. In the present embodiment, the following is conducted, using the well-known Harris corner detector. The CPU 201 uses well-known template matching to acquire feature point candidates in the reference image B that correspond to the acquired feature point candidates in the target image A. Next, from among these acquired feature point candidates, the CPU 201 uses the following method to select candidates such that the difference is less than or equal to a predetermined threshold value (step S402).

Figure 5:
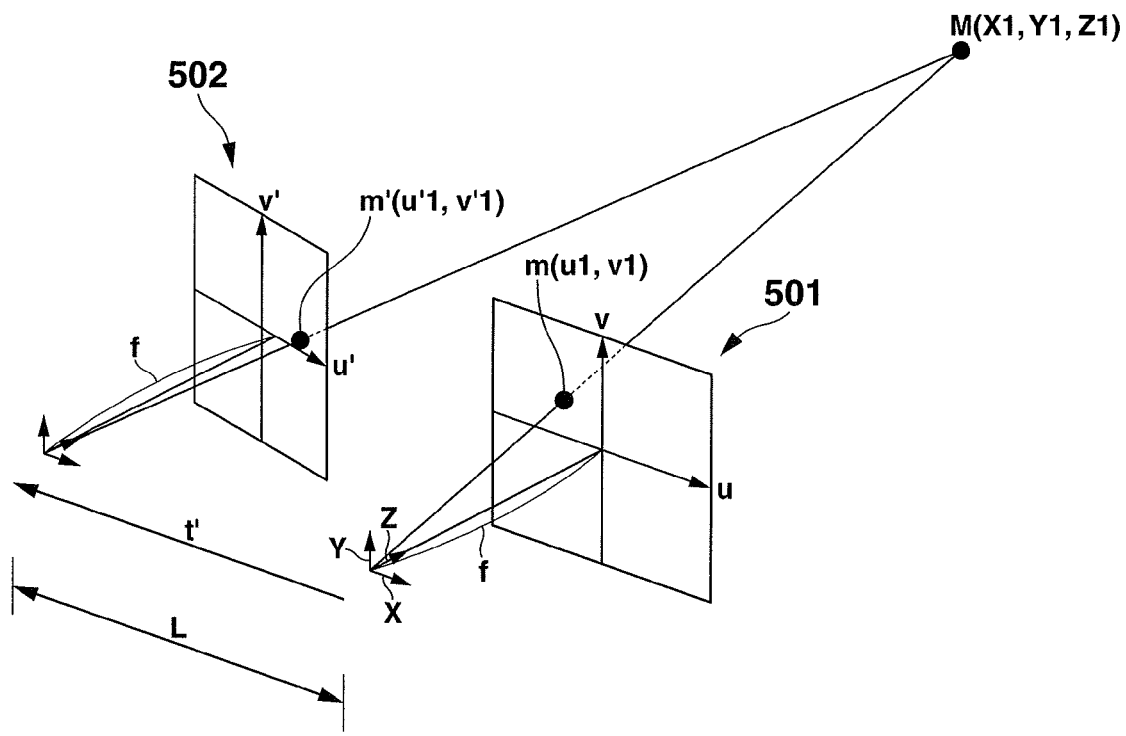
FIG. 5 illustrates a coordinate system for a 3D modeling process.

At this point, the three-dimensional coordinate system introduced in order to conduct the above 3D modeling will be described with reference to FIG. 5. In FIG. 5, 501 is the target image A, 502 is the reference image B, and 't' is a movement vector. The three-dimensional coordinates of one of the feature points in the 3D modeling target image are taken to be 'M'. Assuming that 'm' is the pixel position corresponding to 'M' in the target image A, and that 'm'' is the pixel position corresponding to 'M' in the reference image B, then 'M' can be computed by solving the following EQS. 2 and 3.

$$m \sim P \cdot M \quad (2)$$

$$m' \sim P' \cdot M \quad (3)$$

$$M = trans\begin{pmatrix} X \\ Y \\ Z \\ 1 \end{pmatrix}$$

$$m = trans\begin{pmatrix} u \\ v \\ 1 \end{pmatrix}$$

$$m' = trans\begin{pmatrix} u' \\ v' \\ 1 \end{pmatrix}$$

Herein, 'trans' means a transposed matrix, while '~' means that both sides of the expression are equivalent when allowing for differences by some factor.

In addition, 'P' is the perspective projection matrix of 'M' when imaging the target image A, and is expressed $$P = C \cdot (R|t) \quad (4)$$

(R|t) is a parameter indicating the position where the target image A is imaged. 'R' is a 3×3 rotation matrix, and 't' is a 3×1 translation matrix. In the present embodiment, the origin is taken to be the position where the target image A is imaged, and thus 'R' is taken to be I, and t is taken to be 0 (where I is a 3×3 unit matrix, and 0 is a 3×1 zero matrix).

Similarly, 'P'' is the perspective projection matrix of 'M' when imaging the reference image B, and is expressed $$P' = C \cdot (R'|t') \quad (5)$$

(R'|t') is a parameter expressing the position where the reference image B is imaged. 'R'' is a 3×3 rotation matrix similar to the above 'R', and 't'' is a 3×1 translation matrix similar to the above 't'. Additionally, the rotation matrix 'R'' uses information from the angular velocity sensor. The translation matrix 't'' uses information including the three-dimensional translational distance obtained by twice integrating the acceleration from the acceleration sensor described earlier.

'C' is an internal parameter prepared in advance in the digital camera 1. For example, 'C' may be the 3×3 matrix in the following EQ. 6.

$$C = \begin{pmatrix} f/\delta u & 0 & 0 \\ 0 & f/\delta v & 0 \\ 0 & 0 & 1 \end{pmatrix} \quad (6)$$

In the above 'C', 'f' is the focal length. Also, 'δu' is the horizontal size of the imaging element, while 'δv' is vertical size of the imaging element. Consequently, by solving the above EQS. 2 and 3 using the pixel position 'm' of a feature point in the target image A and the pixel position 'm'' of a corresponding point in the reference image B, the CPU 201 computes the three-dimensional coordinates 'M' for that feature point (step S403).

Expanding EQS. 2 and 3 gives $$u = (p11 \cdot X + p12 \cdot Y + p13 \cdot Z + p14)/(p31 \cdot X + p32 \cdot Y + p33 \cdot Z + p34) \quad (7)$$

$$v = (p21 \cdot X + p22 \cdot Y + p23 \cdot Z + p14)/(p31 \cdot X + p32 \cdot Y + p33 \cdot Z + p34) \quad (8)$$

$$u' = (p'11 \cdot X + p'12 \cdot Y + p'13 \cdot Z + p'14)/(p'31 \cdot X + p'32 \cdot Y + o'33 \cdot Z + p'34) \quad (9)$$

$$v' = (p'21 \cdot X + p'22 \cdot Y + p'23 \cdot Z + p'14)/(p'31 \cdot X + p'32 \cdot Y + p'33 \cdot Z + p'34) \quad (10)$$

Herein, p12 expresses the element in the first row, second column of the known perspective projection matrix 'P', while p'21 similarly expresses the element in the second row, first column of the known perspective projection matrix 'P'', for example.

On the basis of the three-dimensional coordinate components 'M' for a feature point obtained as described above, the CPU 201 constructs a polyhedron, and then converts the polyhedron to polygons for 3D display (step S404). After that, the process returns to step S309 in FIG. 3. Subsequently, the CPU 201 returns to the start step S301 and stands by in step S302 for the user to press the shutter key 9 again.

As described above in detail, according to Embodiment 1, the CPU 201 in 3D modeling mode estimates the distance 'Z' from the digital camera 1 to the subject using the focal length 'f' when imaging the target image A, as shown in FIG. 5. Next, the CPU 201 uses this distance 'Z' as a basis for computing the translational distance 'L' for securing the desired precision. After imaging the target image A, the CPU 201 conducts imaging of the reference image B upon detecting movement of the digital camera 1 equal to the computed translational distance 'L'. Subsequently, the CPU 201 generates a 3D model from the obtained target image A and reference image B.

By configuring an embodiment as described above, a high-precision 3D model can be easily obtained as a result of the user translating the digital camera 1, and without preparing multiple imaging apparatus or special equipment.

Although an acceleration sensor is used herein as the sensor for detecting the translational distance 'L' in the above Embodiment 1, GPS may also be used.

Additionally, in the above Embodiment 1, the translational distance 'L' of the digital camera 1 is computed by the CPU 201, but an embodiment may also be configured such that the translational distance 'L' can be set manually by the user.

Embodiment 2

In Embodiment 2, 3D modeling is conducted by detecting the translational distance of the digital camera 1 according to the movement distance of feature points on a live view image A'. Hereinafter, Embodiment 2 will be described with reference to FIG. 6.

Herein, the distance the user moves the camera (i.e., the number of pixels on the display screen by which the camera is moved) is taken to be determined in advance. The target image A is first imaged and feature points from the imaged target image A are detected. Imaging of the reference image B is then conducted once the feature points have moved the predetermined number of pixels on the display screen.

The number of pixels above is a movement distance, and it is several percent of the image width pixels. Because errors of the comparison will increase, depending on the different of appearance of the subject, when the distance exceeds 10% of the pixels. For example, if the camera is moved 6% in the case where the width pixels of the acquired image is 1600 pixels, then the number of pixels moved becomes 96 pixels. Also, if the width pixels of the live view image A' is taken to be 150 pixels, the 6% movement distance becomes 9 pixels. Consequently, the predetermined number of pixels is taken to be 9 pixels, for example. This number of pixels value is assumed to stored in the flash memory 203 as a default value.

In this case, as also described in Embodiment 1, if the movement distance of the coordinates is large, then the parallax increases, and the precision increases. In contrast, however, if the movement distance of the coordinates (pixels) is large, there is an increased possibility that errors will occur when comparing corresponding points in the target image A and the reference image B, due to the different lines of sight (i.e., different of appearance of the subject). Consequently, Embodiment 2 is configured such that the movement distance of the feature point (i.e., the number of pixels) stored as a default value can be changed by the user as appropriate, prior to imaging in 3D modeling mode. Such change is conducted by operating the cursor key 5 and the SET key 6 while looking at the display unit 4.

Figure 6:
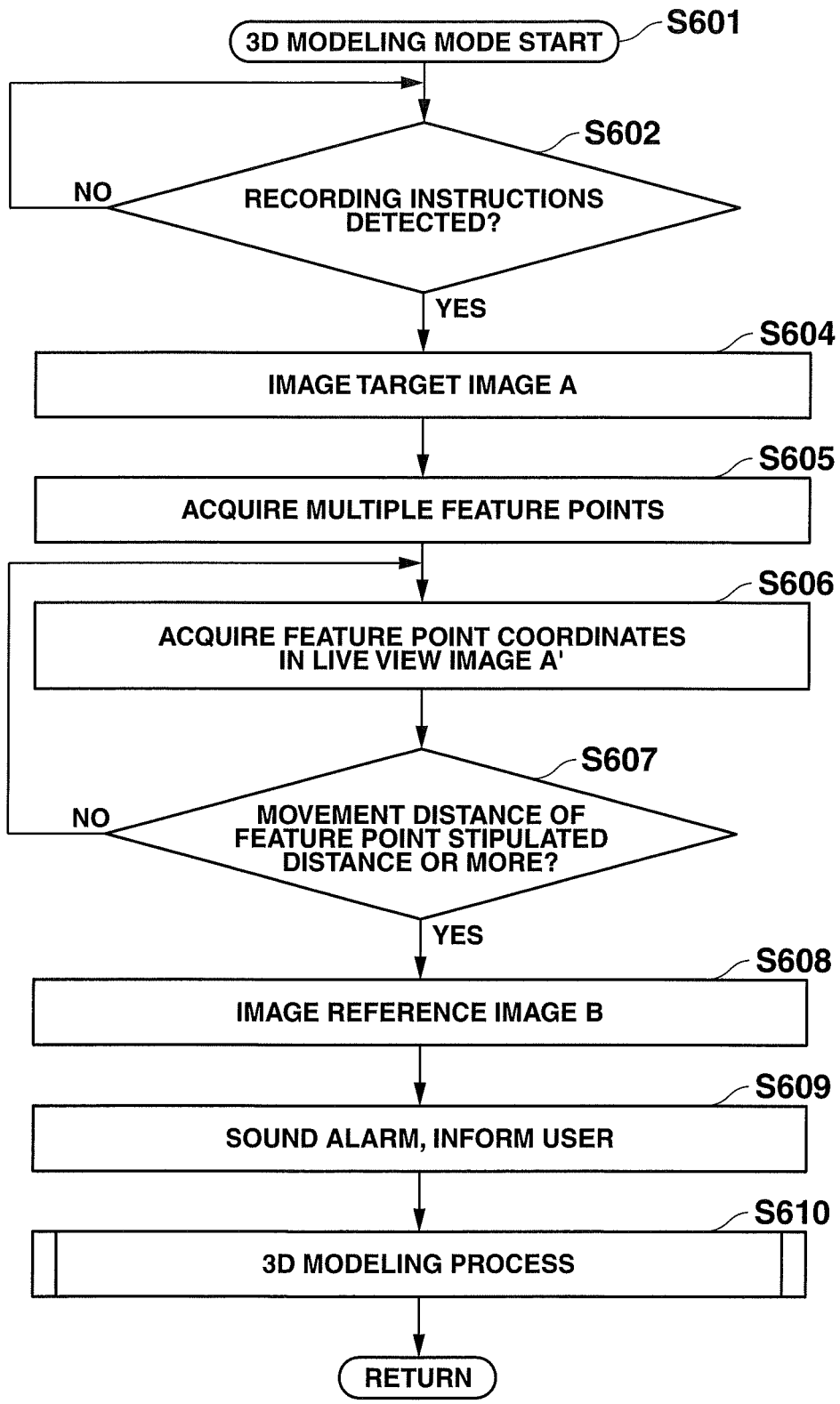
FIG. 6 is a flowchart for explaining a 3D modeling technique wherein the camera position is estimated from live view image information in accordance with Embodiment 2 of the present invention.

When the 3D modeling mode is selected as a result of detecting the user operating the 3D modeling mode key 7, the CPU 201 starts the 3D modeling process shown in FIG. 6 (step S601). First, when the 3D modeling mode is initiated, the CPU 201 determines whether or not recording instructions have been detected (step S602). More specifically, the CPU 201 determines whether or not the user has been detected operating the shutter key 9. If a user operation has not been detected (step S602; NO), then the process stands by until a user operation is detected. If the CPU 201 detects that the shutter key 9 has been pressed by the user (i.e., if the CPU 201 detects recording instructions for the target image A) (step S602; YES), then the CPU 201 images the target image A (step S604). Subsequently, the CPU 201 acquires a plurality of feature points from the imaged target image A using a known method such as Harris corner detection. The CPU 201 then temporarily stores the image and the coordinates for the feature points in the work memory 204 (step S605).

When the user next translates the digital camera 1, the CPU 201 detects, from a live view image A' imaged at a predetermined interval, feature points corresponding to the temporarily-stored plurality of feature points. Subsequently, the on-screen coordinates of the plurality of feature points in the detected live view image A' are acquired (step S606). The CPU 201 then compares the coordinates to the coordinates of the feature points in the temporarily-stored target image A, and on the basis of the error between the compared coordinates, determines whether or not the movement distance of the feature point has reached the stored number of pixels (i.e., movement distance) (step S607). The CPU 201 repeats the above processing (steps S606 and S607) until the movement distance is reached the stored number of pixels number. Herein, when the movement distances differ for a plurality of feature points, the movement distance of a feature point near the center of the live view image A' may be used, or the movement distance of the feature point with the largest movement distance may be used. Alternatively, an arbitrary feature point may be selected from among the feature points detected from the target image A, and the movement distance of the feature point corresponding to the selected feature point may be used.

When the CPU 201 determines that the difference between the coordinates of the feature points in the target image A and the coordinates of the feature points in the live view image A' has reached the stored number of pixels (step S607; YES), the CPU 201 records the base image for the live view image A' as the reference image B (step S608), and informs the user that imaging has finished with an alarm (step S609).

Subsequently, the CPU 201 conducts 3D modeling using the target image A and the reference image B obtained as described above.

Figure 7:
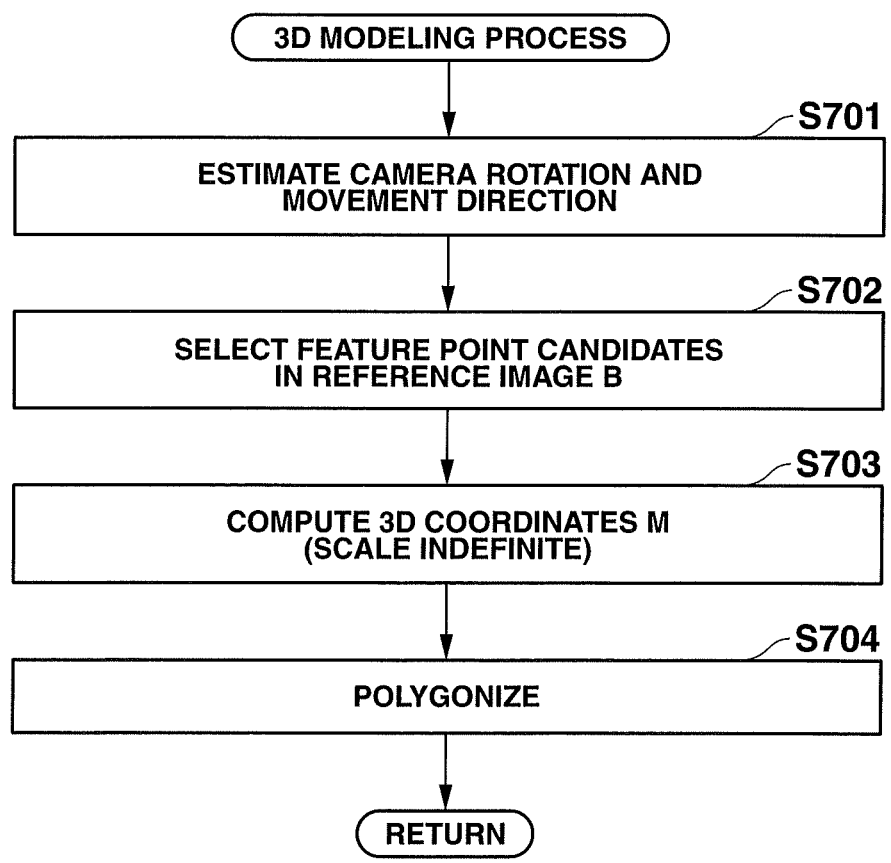
FIG. 7 is flowchart for explaining a 3D modeling process.

Such 3D modeling will now be described with reference to FIG. 7. The CPU 201 respectively computes corresponding points for at least eight points from the above two images, respectively, and computes a fundamental matrix 'F'. The 3×3 fundamental matrix 'F' indicates the convergence conditions for the two images, expressed in the following EQ. 11.

$$\text{trans}(m') \cdot F \cdot m = 0 \tag{11}$$

Herein, 'm' is the pixel position in the target image A, and 'm'' is the pixel position in the reference image B. Also, 'trans( )' herein means the transpose of a matrix.

In addition, 'F' is expressed by the following EQ. 12

$$F = \text{trans}(\text{inv}(C)) \cdot <t> \cdot R \cdot \text{inv}(C) \tag{12}$$

Herein, 'inv( )' means the inverse matrix, while '< >' means the skew symmetric matrix. The internal parameter 'C' is a value prepared in advance, and as a result, the rotation matrix 'R' and the orientation of the movement vector 't' can be computed (step S701).

Figure 4:
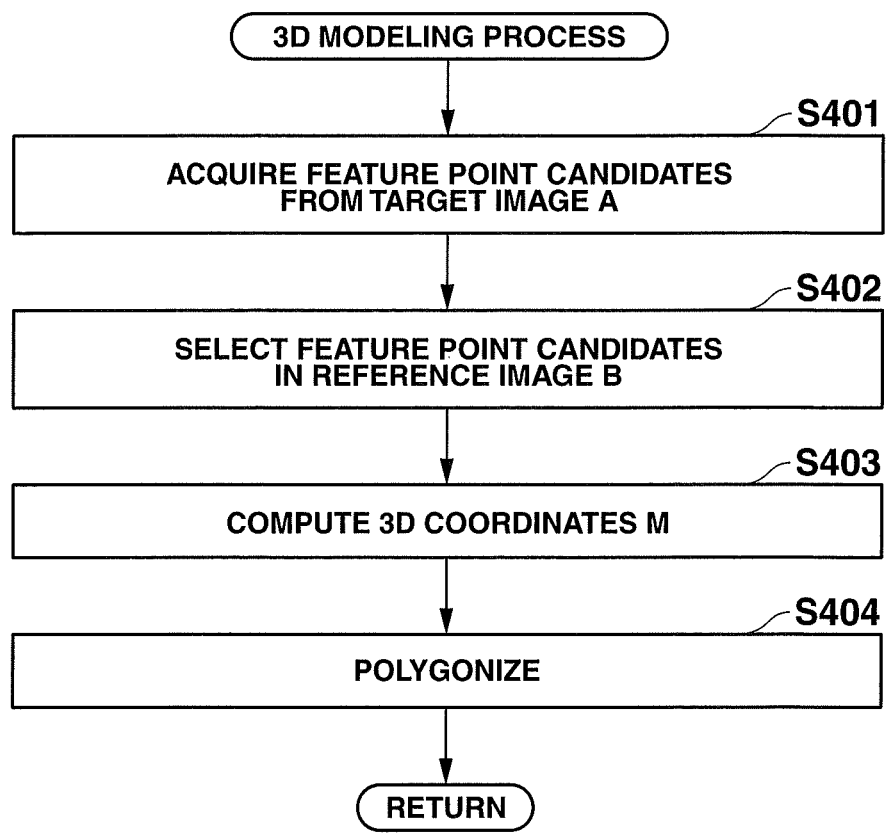
FIG. 4 is a flowchart for explaining a 3D modeling process.

Thereafter, 3D modeling may be conducted in a manner similar to the procedure shown in FIG. 4 (steps S702 to S704).

As described above in detail, according to Embodiment 2, upon imaging the target image A, the CPU 201 first detects feature points from the imaged target image A. Subsequently, the movement distance of the digital camera 1 is estimated from the movement distance of the detected feature points on the live view image A'. When that translational distance reaches a desired translational distance, the reference image B is automatically imaged. In so doing, a high-precision 3D model can be obtained without providing a sensor for detecting movement distance.

Embodiment 3

Figure 8:
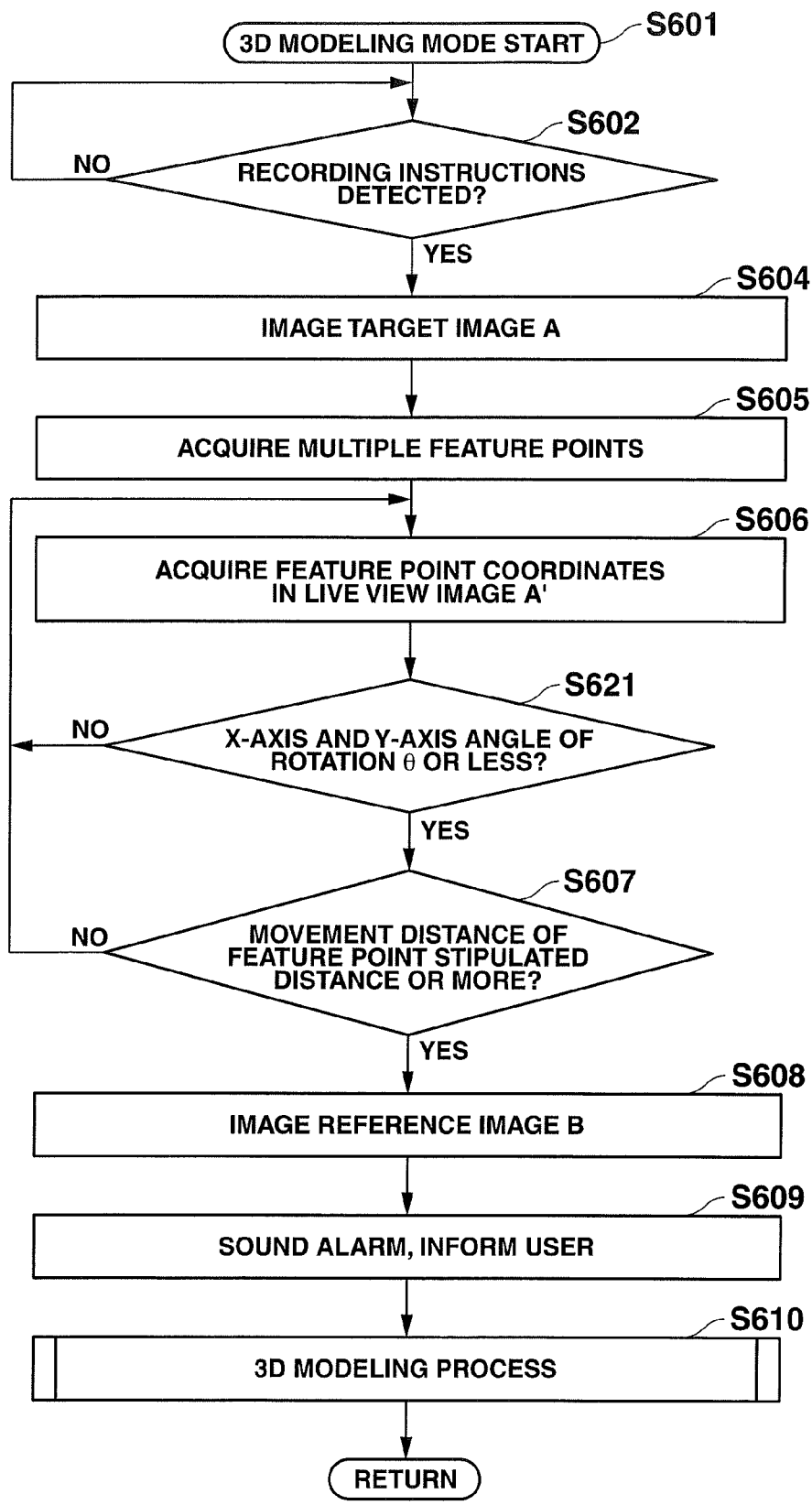
FIG. 8 is a flowchart explaining a 3D modeling technique in accordance with Embodiment 3 of the present invention.

FIG. 8 is a flowchart explaining a 3D modeling technique in accordance with Embodiment 3 of the present invention.

The flowchart in FIG. 8 differs from the flowchart in FIG. 6 in that imaging operation is restricted in the case where a rotation is made about an axis other than the optical axis of the digital camera 1 (i.e., the Z axis in FIG. 5). In other words, when a rotation occurs about the X or Y axis in FIG. 5, the CPU 201 does not recognize the digital camera 1 as having been translated. In other words, the CPU 201 is configured to not acquire the reference image B when the rotation is equal to or greater than a predetermined threshold value, since the optical axis is no longer near-parallel. In so doing, it can be more accurately determined whether or not the translational distance of the digital camera 1 has reached the predetermined distance. Consequently, the 3D modeling precision can be further improved.

Hereinafter, the processing in step S621 that is added to FIG. 8 as compared to FIG. 6 will be described.

The CPU 201 extracts feature points from the live view image A', and estimates the essential matrix 'F' according to the sequence described earlier. The internal parameter 'C' of the digital camera 1 is herein taken to be computed in advance.

$$C = \begin{pmatrix} f & 0 & cx \\ 0 & f & cy \\ 0 & 0 & 1 \end{pmatrix} \quad (13)$$

Herein, 'f' expresses the focal length of the digital camera 1, while 'cx' and 'cy' express the center position of the optical axis of the digital camera 1 in the image coordinates. Given the above, the essential matrix 'E' can be computed using the following EQ. 14.

$$E = \text{trans}(C) \cdot F \cdot C \quad (14)$$

Herein, 'trans( )' indicates the transpose of a matrix. The movement vector 't' for the camera movement shown in the following EQ. 15 can be computed as the eigenvector of the minimum eigenvalues of 'trans(E)·E'. Although the scale and sign of t is indefinite, the sign of 't' can be computed by applying the constraint that the subject exists in front of the digital camera 1.

Thus, the cross product of '−t' and 'E' is computed, and this cross product is then subjected to a singular value decomposition according to the following EQ. 15.

$$V \cdot S \cdot U = \text{svd}(\text{cross}(-t, E)) \quad (15)$$

Herein, 'cross' indicates the cross product, while 'svd' indicates the singular value decomposition.

Meanwhile, the rotation matrix a' can be computed using the following EQ. 16.

$$R = V \cdot \text{diag}(1, 1, \det(V \cdot U)) \cdot U \quad (16)$$

Herein, 'det' indicates the determinant, while 'diag' indicates the diagonal matrix.

Since the rotation matrix a' includes rotations about the X, Y, and Z axes, these are decomposed. In the case where the angle of rotation is small, and assuming $$R = \begin{pmatrix} r00 & r01 & r02 \\ r10 & r11 & r12 \\ r20 & r21 & r22 \end{pmatrix} \quad (17)$$

then $$\theta y = \arcsin(r02) \quad (18)$$

$$\theta x = \arctan(-r12/r22) \quad (19)$$

In step S621, the CPU 201 determines whether or not the above '$\theta y$' and '$\theta x$' are less than or equal to a predetermined threshold value '$\theta$'.

As described above, according to Embodiment 3, the processing in the above step S621 has been added with respect to Embodiment 2. As a result, the embodiment is configured to not acquire the reference image B when the rotation is equal to or greater than a predetermined threshold value, since the optical axis is no longer near-parallel. In so doing, it can be more accurately determined whether or not the translational distance of the digital camera 1 has reached the predetermined distance. Consequently, the 3D modeling precision can be further improved.

(Modifications)

(1) In the foregoing Embodiments 1 to 3, the user is described as translating the digital camera 1. However, the digital camera 1 may also be affixed to a stand, wherein a mechanism for parallel movement is provided in the stand. In so doing, the user is not required to translate the digital camera 1. Furthermore, the addition of rotations to the digital camera 1 can be prevented.

Mechanisms of this type can be implemented by using well-known traversal mechanisms.

(2) Additionally, in the foregoing embodiments, the entire digital camera 1 is described as being translated. However, a mechanism for translating the optics 2 themselves may also be provided in the digital camera 1. In so doing, the user is not required to translate the camera, and imaging can be conducted even when the camera is affixed to a tripod or stand.

(3) Additionally, in the foregoing embodiments, the 3D modeling is described as being conducted in the digital camera 1. However, the digital camera 1 may also just conduct the imaging and recording of the target image A and the reference image B. The recorded data may then be sent to a personal computer where the 3D modeling processing is executed.

(4) Additionally, in the foregoing embodiments, an imaging apparatus is described. However, an imaging control program for remaking the existing camera in Embodiments 1 to 3 into an imaging apparatus in accordance with the present invention may also be recorded onto a recording medium and provided.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. An imaging apparatus, comprising:
a first imaging controller configured to control imaging by an imaging unit;
a movement distance acquirer configured to acquire a movement distance of the imaging unit required to generate a three-dimensional model of an imaged subject after the imaging controlled by the first imaging controller;
a determining unit configured to determine whether the imaging unit has moved the movement distance acquired by the movement distance acquirer;
a second imaging controller configured to control imaging by the imaging unit when it is determined by the determining unit that the imaging unit has moved the movement distance;
a three-dimensional model generator configured to generate the three-dimensional model of the subject from an image acquired in the imaging controlled by the first imaging controller and an image acquired in the imaging controlled by the second imaging controller; and
a subject distance acquirer configured to acquire a distance to the subject;
wherein the movement distance acquirer calculates the movement distance L of the imaging unit required to generate the three-dimensional model of the subject, according to $L=(Z*Z*p)/(\Delta Z*f)$ where (i) Z represents the distance to the subject, (ii) p represents a pixel size of an image sensor, (iii) $\Delta Z$ represents an acceptable error of the distance Z, and (iv) f represents a focal length.

2. The imaging apparatus according to claim 1, further comprising:
an acceleration acquirer configured to acquire an acceleration when the imaging unit moves;
wherein, based on the acceleration acquired by the acceleration acquirer, the determining unit determines whether the imaging unit has moved the movement distance acquired by the movement distance acquirer.

3. The imaging apparatus according to claim 1, further comprising:
a feature point detector configured to detect a feature point from the image acquired in the imaging controlled by the first imaging controller;
a third imaging controller configured to control the imaging unit to repeatedly conduct imaging at predetermined intervals once the imaging controlled by the first imaging controller has finished; and
a feature point movement distance acquirer configured to acquire a movement distance of a point corresponding to the feature point detected by the feature point detector in images acquired in the repeated imaging controlled by the third imaging controller;
wherein, based on the movement distance of the feature point acquired by the feature point movement distance acquirer, the determining unit determines whether the imaging unit has moved the movement distance acquired by the movement distance acquirer.

4. The imaging apparatus according to claim 3, further comprising:
a display unit configured to sequentially display the images acquired in the repeated imaging controlled by the third imaging controller on a screen;
wherein the feature point movement distance acquirer acquires the movement distance of the feature point based on a change in a position of the point corresponding to the feature point detected by the feature point detector on the screen.

5. The imaging apparatus according to claim 1, wherein:
the determining unit determines whether an optical axis after the imaging controlled by the first imaging controller has been kept parallel with the optical axis during the imaging controlled by the first imaging controller; and
the imaging apparatus further comprises a fourth imaging controller configured to perform control such that the imaging controlled by the second imaging controller is not conducted when it is determined by the determining unit that the optical axis after the imaging controlled by the first imaging controller has not been kept parallel with the optical axis during the imaging controlled by the first imaging controller.

6. The imaging apparatus according to claim 1, further comprising a reporting unit configured to report when it is determined by the determining unit that the imaging unit has moved the movement distance.

7. An imaging control method, comprising:
controlling a first imaging by an imaging unit;
acquiring a movement distance of the imaging unit required to generate a three-dimensional model of an imaged subject after the first imaging;
determining whether the imaging unit has moved the acquired movement distance;
controlling a second imaging by the imaging unit when it is determined that the imaging unit has moved the movement distance;
generating the three-dimensional model of the subject from an image acquired in the first imaging and an image acquired in the second imaging; and
acquiring a distance to the subject;
wherein acquiring the movement distance comprises calculating the movement distance L of the imaging unit required to generate the three-dimensional model of the subject, according to $L=(Z*Z*p)/(\Delta Z*f)$ where (i) Z represents the distance to the subject, (ii) p represents a pixel size of an image sensor, (iii) $\Delta Z$ represents an acceptable error of the distance Z, and (iv) f represents a focal length.

8. A non-transitory computer-readable recording medium recording a program that causes a computer provided in an imaging apparatus to function as units comprising:
a first imaging controller configured to control imaging by the imaging apparatus;
a movement distance acquirer configured to acquire a movement distance of the imaging apparatus required to generate a three-dimensional model of an imaged subject after the imaging controlled by the first imaging controller;
a determining unit configured to determine whether the imaging apparatus has moved the movement distance acquired by the movement distance acquirer;
a second imaging controller configured to control imaging by the imaging apparatus when it is determined by the determining unit that the imaging apparatus has moved the movement distance;
a three-dimensional model generator configured to generate the three-dimensional model of the subject from an image acquired in the imaging controlled by the first imaging controller and an image acquired in the imaging controlled by the second imaging controller; and
a subject distance acquirer configured to acquire a distance to the subject,
wherein the movement distance acquirer calculates the movement distance L of the imaging unit required to generate the three-dimensional model of the subject, according to $L=(Z*Z*p)/(\Delta Z*f)$ where (i) Z represents the distance to the subject, (ii) p represents a pixel size of an image sensor, (iii) $\Delta Z$ represents an acceptable error of the distance Z, and (iv) f represents a focal length.

* * * * *